(12) United States Patent
Warren

(10) Patent No.: US 7,823,900 B2
(45) Date of Patent: Nov. 2, 2010

(54) RETRACTABLE PEG SYSTEM

(75) Inventor: Kevin Warren, 265 Tara Trl. NW., Atlanta, GA (US) 30327

(73) Assignee: Kevin Warren, Atlanta, GA (US)

( * ) Notice: Subject to any disclaimer, the term of this patent is extended or adjusted under 35 U.S.C. 154(b) by 5 days.

(21) Appl. No.: 12/360,630

(22) Filed: Jan. 27, 2009

(65) Prior Publication Data

US 2010/0187792 A1    Jul. 29, 2010

(51) Int. Cl.
B62J 25/00       (2006.01)
(52) U.S. Cl. .................... 280/291; 280/288.4; 280/294; 280/163; 280/164.1; 74/564; 180/219
(58) Field of Classification Search ................ 280/291, 280/288.4, 294, 163, 164.1; 180/90.6, 219; 74/564; 248/688, 122.1
See application file for complete search history.

(56) References Cited

U.S. PATENT DOCUMENTS

| | | | |
|---|---|---|---|
| 6,178,613 B1 * | 1/2001 | Monson | 29/401.1 |
| 6,339,972 B1 * | 1/2002 | Paris | 74/564 |
| D483,699 S * | 12/2003 | Anthony | D12/114 |
| 6,719,316 B1 * | 4/2004 | Anthony | 280/291 |
| 6,893,038 B2 * | 5/2005 | Egan | 280/291 |
| D506,707 S * | 6/2005 | Egan | D12/114 |
| 7,287,773 B1 * | 10/2007 | Stahel et al. | 280/291 |
| D560,562 S | 1/2008 | Egan et al. | |
| 7,431,118 B1 * | 10/2008 | Hogg | 180/219 |
| 7,497,291 B1 * | 3/2009 | McKim | 180/90.6 |
| D599,712 S * | 9/2009 | Warren | D12/114 |
| D608,252 S * | 1/2010 | Warren | D12/114 |
| 2005/0012300 A1 * | 1/2005 | Egan | 280/291 |
| 2005/0116443 A1 * | 6/2005 | Egan | 280/291 |
| 2005/0188782 A1 * | 9/2005 | Khiev | 74/560 |
| 2007/0057484 A1 * | 3/2007 | Gilman | 280/291 |

OTHER PUBLICATIONS

U.S. Appl. No. 29/335,183, filed Apr. 9, 2009, Warren.
U.S. Appl. No. 29/340,707, filed Jul. 23, 2009, Warren.
U.S. Appl. No. 29/340,708, filed Jul. 23, 2009, Warren.

* cited by examiner

*Primary Examiner*—Lesley Morris
*Assistant Examiner*—Tashiana Adams
(74) *Attorney, Agent, or Firm*—Foley & Lardner LLP

(57) ABSTRACT

A retractable peg system for a motorcycle including a bracket operatively attachable the motorcycle and a peg rotatably coupled to the bracket and rotatable between a retracted safe storage orientation and an extended use orientation. In the extended orientation, the peg is disposed such that a rider may rest a foot on the peg while seated. The retractable peg system further includes a biasing member to substantially maintain the orientation of the peg in its presently retracted or extended orientation absent application of an external force acting on the peg. The components of the retractable peg system may be configured to provide a visually integrated appearance in relation to the motorcycle.

20 Claims, 5 Drawing Sheets

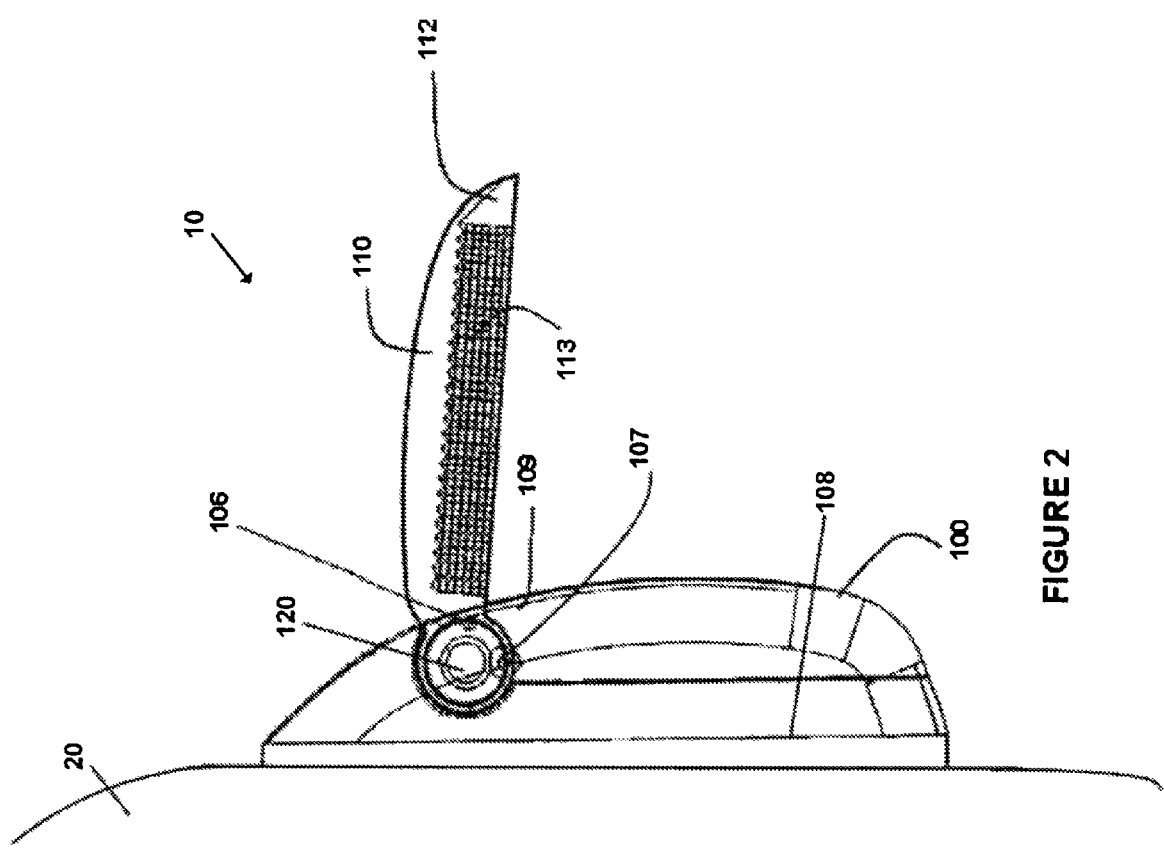

RETRACTABLE PEG SYSTEM

FIELD OF THE INVENTION

The present invention relates generally to the field of foot peg systems. More particularly, the present invention relates to a retractable foot peg system attachable to a motorcycle.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The use of foot pegs or highway pegs on a motorcycle is well established. Pegs extending generally outwardly from the left and right sides of the motorcycle present a pair of surfaces that a rider may rest their feet upon while riding the motorcycle. Pegs are typically an after-market accessory that may be attached to the motorcycle by an owner or installer. Pegs have been constructed in a variety of configurations and shapes, including rod-like structures, pedal shaped blocks, and other configurations. The left and right pegs are typically individually attached to a portion of the body of the motorcycle near a left and right lower portion of the motorcycle that is proximate the position of the rider's feet while in a riding position. Thus, the rider may comfortably rest each foot on a surface of the peg that extends outwardly from each side of the motorcycle.

SUMMARY OF THE INVENTION

Various embodiments of the present invention provide a peg system that may be mounted to a ride-on passenger vehicle, such as a motorcycle. The peg system generally comprises a peg rotatably connected to a bracket. The bracket is operatively connected to the motorcycle. The peg may comprise a elongated member of uniform or varying cross-section. In one embodiment, each of a left and right peg system is installed on the respective sides of the motorcycle. In particular embodiments, the peg system may be particularly configured to integrate with the structural and/or aesthetic features of the motorcycle. Thus, the peg system may be adapted to aesthetically blend with the existing features of the motorcycle proximate the attachment position of the peg system so to provide an integrated or unobtrusive appearance of the peg system with the motorcycle. The peg is further rotatably orientatable in relation to the bracket such that the peg may be rotated from a retracted "storage" orientation to an extended "use" orientation. In the retracted orientation, the peg is folded substantially parallel with the longitudinal axis of the motorcycle and may be substantially flush with an outer lateral surface of the bracket. The peg may be configured to aesthetical blend with the shape of the bracket and the motorcycle when in the retracted orientation. In the extended orientation, an end of the peg is rotated outwardly to extend the peg laterally from the body of the motorcycle, providing a resting surface for the riders foot.

In one set of embodiments, the peg system comprises a bracket adapted for attachment to the motorcycle and a peg rotatably connected to the bracket. The bracket may be configured for attachment to various locations on the motorcycle, for example, a valve cover, a fairing, or other location. Further, the bracket may include a plurality of openings and/or one or more engagement features or positions to allow for adjustable installation of the peg system in relation to the motorcycle, thereby providing a substantially customized peg position based on the proportions of the rider and comfort of the rider. The bracket includes a pivot portion and may include a recessed portion. The peg is rotatably moveable between a retracted orientation and an extended orientation about the pivot portion of the bracket. In the retracted orientation, the peg may be at least partially received in the recessed portion of the bracket. The peg system may further include a biasing member operatively connected to the bracket and/or the peg. The biasing member may act upon the peg to retain the peg in its present orientation, retracted or extended. The action of the biasing member may be overcome by the rider to move the peg between the extended and retracted orientations (and vice-versa) while riding. For example, the biasing and shape of the peg may be configured to permit the rider to extend and/or retract the peg with his/her foot while in a riding position on the motorcycle. Similarly, the action of the biasing member is also overcome in a slide or other event when the peg contacts the ground, thereby causing the peg to rotate into the retracted orientation for safety and allowing for a natural slide of the bike. Thus, the orientation of the peg is substantially maintained absent the application of an external force upon the peg.

Thus, various embodiments provide a peg system that offers comfort to a rider and may provide an integrated appearance with the motorcycle. The peg system also provides convenient operation that allows the peg to be readily maneuvered between an extended and retracted orientation by a rider, while also providing safety advantages to the rider. Further, the bracket may be configured for adjustable operative connection of the peg system to the motorcycle to provide a substantially custom experience for the rider.

These and other features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 2 is a top plan view of the peg system of FIG. 1A adapted for attachment to the right side of a motorcycle;

DETAILED DESCRIPTION OF VARIOUS EMBODIMENTS

Figure 1A:
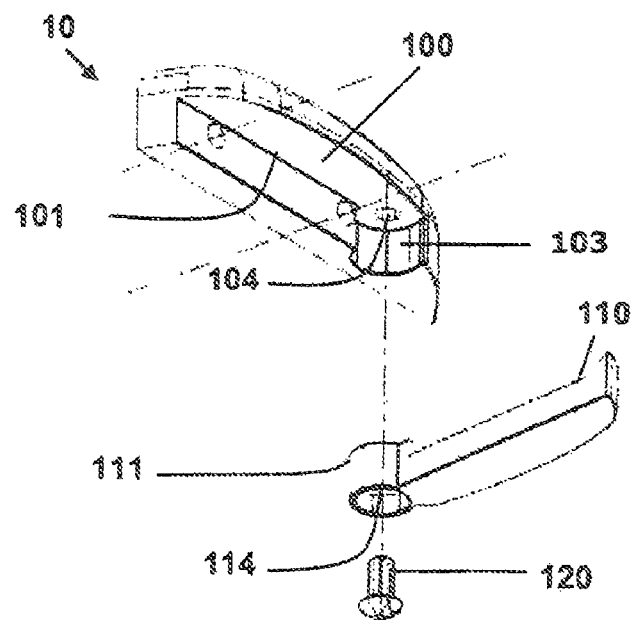
FIG. 1(A) is an exploded view of an embodiment of the peg system of the present invention.
Figure 1B:
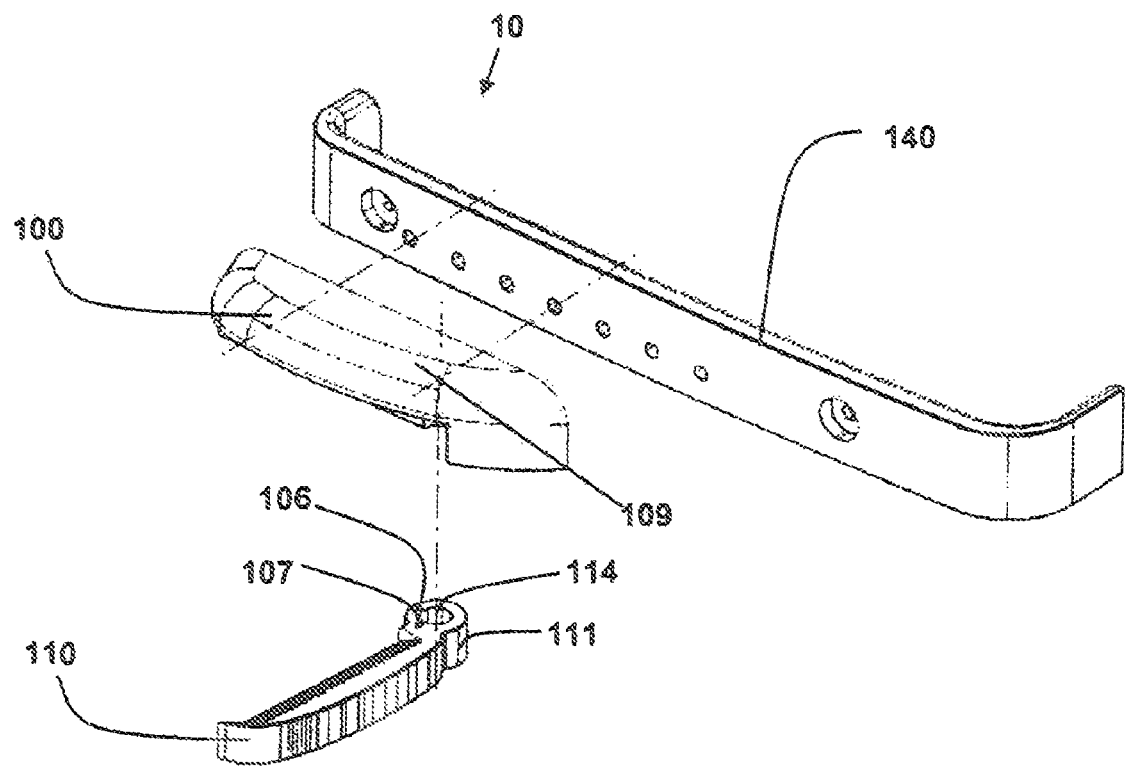
FIG. 1(B) is an exploded view the peg system of FIG. 1A showing an optional attachment member.

FIGS. 1(A) and 1(B)-8 illustrate a peg system 10 constructed in accordance with an embodiment of the present invention. The peg system 10 comprises a bracket 100 and a peg 110 rotatably connected to the bracket 100. The peg system 10 may further include an axle member 120 that rotatably couples the peg 110 to the bracket 100. In one installation, a pair of peg systems 10 are attached to the motorcycle 20—one on each of the left and right sides of the motorcycle 20 proximate the feet of a rider. In various embodiments, a second pair of the peg systems 10 may be operatively attached to the motorcycle 20 proximate the location of a passenger's feet.

Figure 7:
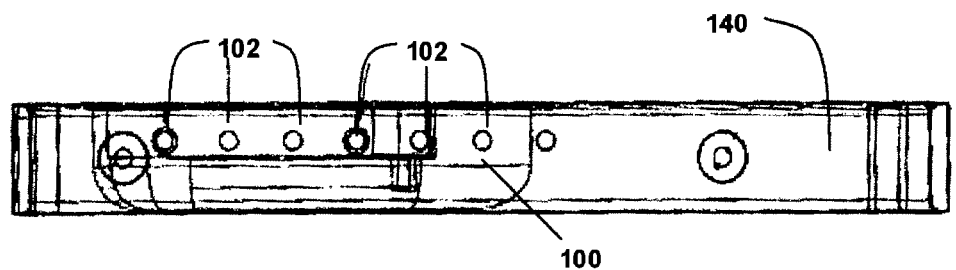
FIG. 7 is a top view showing the peg system of FIG. 1B in an assembled state.

The peg 110 is selectively orientatable by a rider from a retracted orientation, where the peg 110 is orientated near or at least partially received by the bracket 100, to an extended orientation as shown in FIGS. 2 and 7. In the retracted orientation, the peg 110 may be orientated substantially parallel with the longitudinal axis of the motorcycle. The result is an integrated appearance of the peg system 10 relative to the features and/or finish of the motorcycle. However, and as described in further detail below, other configurations may also be constructed providing alternative orientations for the peg 110. The peg 110 is deployed outwardly in relation to the side of the motorcycle in the extended orientation, substantially normal to the retracted orientation. Variation in the extended orientation of the peg 110 may be implemented, as described below, to account for greater rider comfort.

Figure 5:
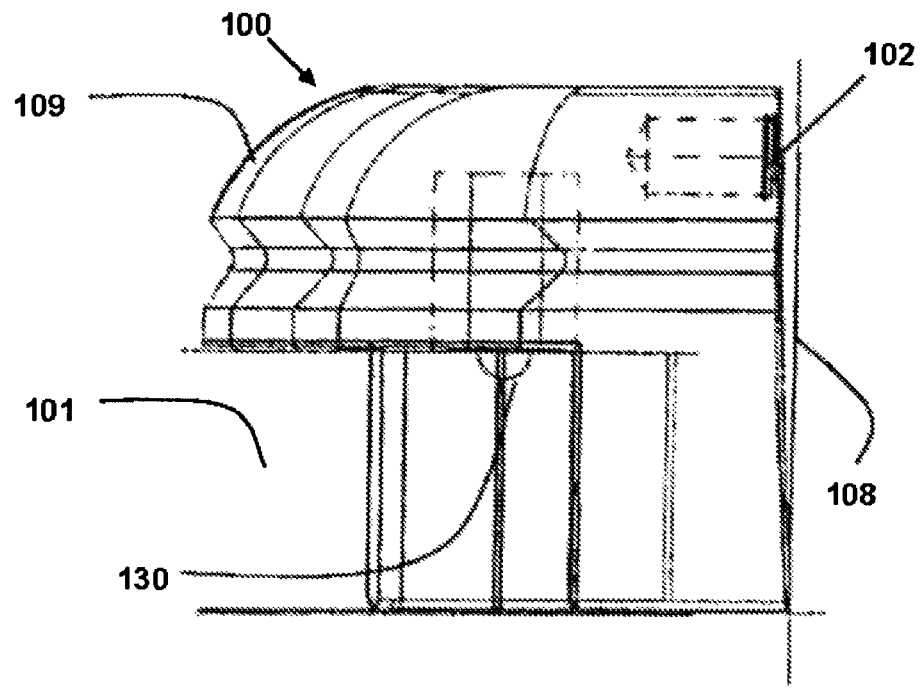
FIG. 5 is an end view of the bracket of FIG. 4.
Figure 8:
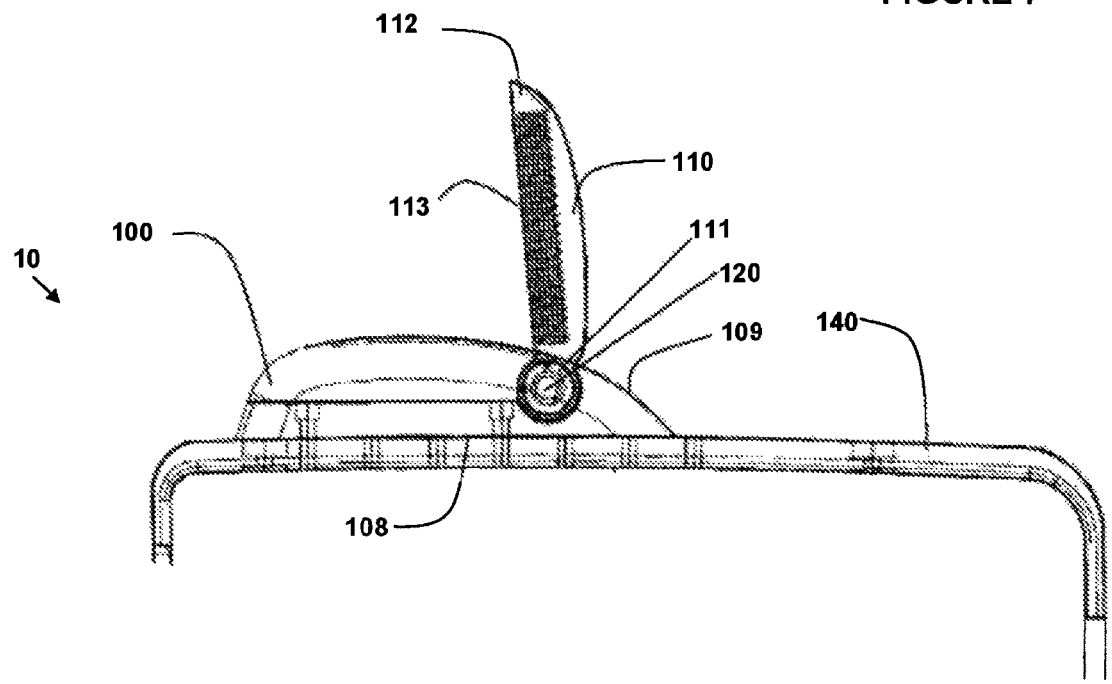
FIG. 8 is a front view showing the peg system of FIG. 7.

The bracket 100 is operatively attached to a portion of the motorcycle such that the peg system 10 is positioned in proximity to the riders feet and a rider may comfortably rest his feet on the respective pegs 110 when deployed in the extended orientation. The peg system may be bolted, welded or otherwise securely attached to the motorcycle. For example, the bracket 100 may be adapted for attachment to various locations on the motorcycle, including locations such as a valve cover, a fairing or other locations. In various embodiments, an adapter or attachment member 140, as shown in FIGS. 7 and 8, may be used to facilitate attachment of the bracket 100 to the motorcycle. The configuration of the attachment member 140 may be varied depending on the model of motorcycle and/or the attachment point. The bracket 100 may be configured to substantially match or blend with the surrounding portions of the motorcycle proximate the connection location to provide an integrated appearance of the peg system 10 relative to the motorcycle. In the depicted embodiment, the bracket 100 is operatively attachable to the valve cover of the motorcycle. As shown in FIG. 5, a inner bracket surface 108 substantially corresponds with a mating surface of the adjacent valve cover, thereby presenting a relatively contiguous and uniform appearance. Likewise, as can be seen in FIG. 2, an outer surface 109 of the bracket may also be configured to complement the form of the valve cover, or other component that the peg system 10 is mounted to or positioned near. Regardless of the attachment location, the peg system 10 may be constructed to visually integrate with the motorcycle 20, providing a uniform appearance and the look of an original component of the motorcycle 20.

Other embodiments of the bracket 100 are readily constructed to substantially correspond with and attach to other components on the motorcycle. Further, the bracket 100 is not limited to a configuration that substantially corresponds to other components on the motorcycle, but may instead include additional decorative features that distinguish the peg system 10 from the surrounding region of the motorcycle. Still further, the peg system 10 may comprise a bracket cover (not shown) attachable to the bracket 100 and corresponding to features of a particular motorcycle, and/or customizable to a particular configuration and/or color based on the requirements of a rider. Accordingly, one or more substantially standardized brackets 100 may be produced, while a number of bracket covers that attach to the bracket 100 and employ a variety of features to match a particular motorcycle or aesthetic choice may be offered.

Figure 4:
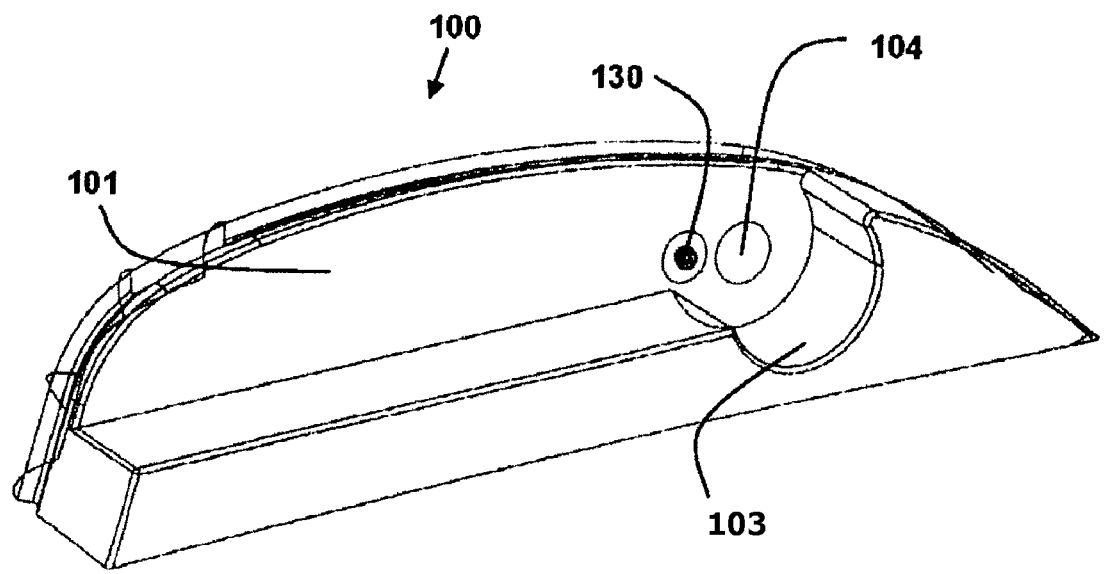
FIG. 4 is a bottom perspective view of a bracket of the peg system of FIG. 1A.

With reference to FIG. 4, the bracket 100 may include a recessed portion 101 and a pivot portion 103. The recessed portion 101 is configured to at least partially received the peg 110 when in the retracted orientation. The recessed portion 101 may be disposed toward a bottom portion of the bracket 100, as shown. However, the recessed portion 101 may also be located on an upper portion of the bracket 100 or centrally located on the bracket 100. Other configurations are also possible. For example, the recessed portion 101 may be continuous over the entire height of the bracket 100.

Figure 6:
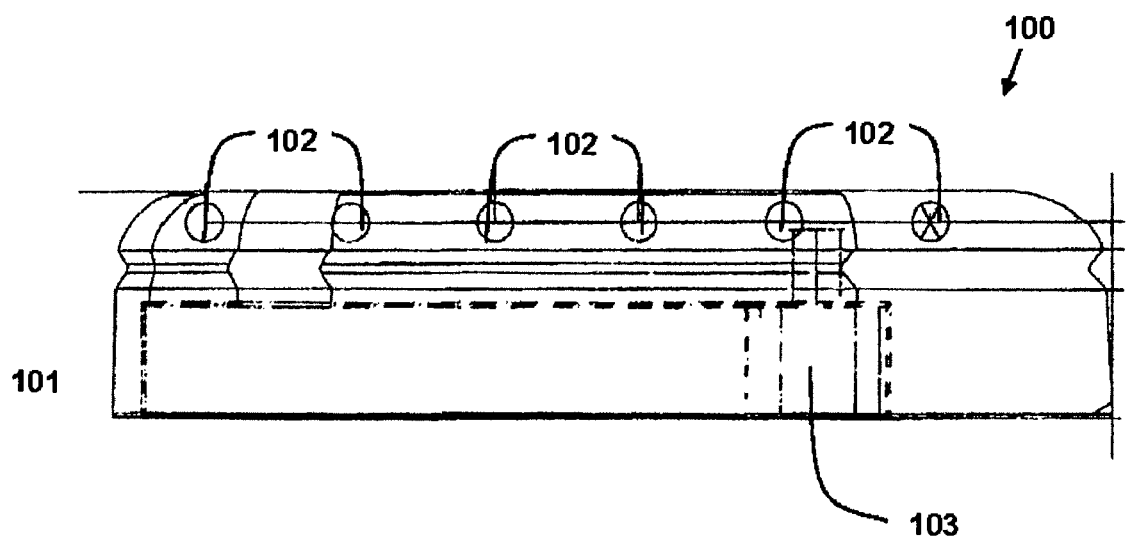
FIG. 6 is an rear view of the bracket of FIG. 4.

The peg system 10 may be configured for adjustable attachment such that the installed position of the peg system 10 may be altered on the motorcycle to match a particular motorcycle and/or rider. As depicted in FIG. 6, the bracket 100 may include a plurality of openings 102 on the inner bracket surface 108. The plurality of openings 102, which may be blind or through holes, are disposed on bracket 100 and configured to receive connecting members for attachment of the bracket 100 to the motorcycle. The plurality of openings 102 may exceed the number required for attachment of the bracket 100 to the motorcycle. For example, in the depicted embodiment, the plurality of openings 102 includes six openings, and two connecting elements may be used in any of the six openings for attachment of the bracket 100 to the motorcycle. Accordingly, the relative position of the bracket 100 on the motorcycle may be adjusted to accommodate riders of various proportions, customize the comfort of a particular rider, or be configurable for various attachment points or motorcycle models. In a particular embodiment, the plurality of openings 102 allow for substantially horizontal adjustment of the attachment location of the bracket 100 to the motorcycle of up to about 4 inches. In yet another embodiment, the plurality of openings 102 may comprise a plurality of vertical or horizontal slots to provide additional adjustability. In still other embodiments, the bracket 100 is provided with additional openings or engagement features to facilitate attachment to a variety of components of various motorcycles.

As shown in FIG. 4, the pivot portion 103 is disposed proximate a forward portion of the bracket 100. The pivot portion 103 may be partially recessed in the bracket 100 to allow the peg 110 to close flush in relation to the bracket 100. The pivot portion 103 may include a pivot opening 104 that defines an axis of rotation for the peg 110 relative to the bracket 100. The axis of rotation is orientated in a substantially vertical direction, which allows for the peg 110 to rotate outwardly and laterally from the side of the motorcycle to the extended orientation. Variation from the substantially vertical orientation of the pivot opening 104 in the longitudinal and/or lateral directions may be included to accommodate particular configurations of the peg system 10. Indeed, in embodiments, the pivot opening could be substantially horizontal and orientated in a substantially longitudinal or lateral direction, or orientations therebetween, relative to the motorcycle.

Regardless of the orientation, the peg 110 rotatably connects to the bracket 100 at the pivot opening 104. As shown in FIG. 2, the pivot opening 104 is adapted to receive an axle member 120 rotatably connected to the peg 110. The pivot opening 104 may be threaded for attachment of the axle member 120. In an alternative embodiment, (not shown) the pivot portion 103 may integrate at least a portion of an axle receivable by the peg 110 instead of the pivot opening 104. A biasing member 130 may be operatively connected to the bracket 100 proximate the pivot portion 103. In a particular embodiment, the biasing member 130 comprises a spring plunger that protrudes from a surface of the bracket 100 as shown in FIG. 4.

The biasing member 130 may work in conjunction with one or more detents that may be disposed on, for example, the peg 110, and operate to substantially maintain the peg 110 in its present orientation. With reference to FIG. 2, one or more detents may be disposed on a surface of the peg 110 substantially opposing the biasing member 130. The one or more detents may, for example, comprise a spherical radius to partially accept a portion of the spring plunger of the biasing member 130. As shown, the one or more detents include a first detent 106 and a second detent 107. The first detent 106, in conjunction with the biasing member 130, substantially maintains the peg 110 in the retracted orientation such that peg 110 is not freely rotatable without application of an external force on the peg 110.

The peg 110 will not inadvertently rotate outward to the extended or partially extended orientation absent application of an external force upon the peg 110. However, the supplied bias may be readily overcome by the rider, including while operating the motorcycle, to intentionally rotate the peg 110 to the extended orientation. Similarly, the second detent 107, in conjunction with the biasing member 130, substantially maintains the peg 110 in the extended orientation. Thus, the peg 110 will not inadvertently close to the retracted or partially retracted orientation while in use, absent the application of an external force upon the peg 110. Again, the rider may readily overcome the supplied bias to intentionally rotate the peg 110 to the retracted orientation. The biasing force may be selected to allow for extension and retraction by the rider's foot while in a riding position on the motorcycle. Moreover, the bias will be overcome in the event the peg 110 contacts the ground, rotating the peg 110 to the retracted orientation for safety. Accordingly, in the event of, for example, a slide, where a side of the motorcycle comes in proximity to the ground, the peg 110 will not become a potentially dangerous rotational pivot point for the motorcycle and rider. The configuration of the biasing member 130 and the one or more detents may be reversed in relation to the bracket 100 and the peg 110. That is, the biasing member 130 may be disposed in the peg 110 and the one or more detents disposed in the bracket 100.

Figure 3:
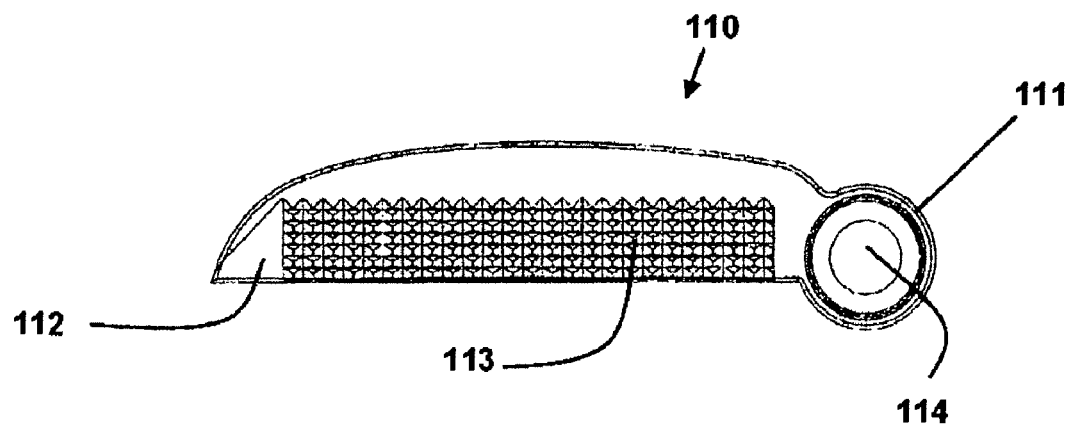
FIG. 3 is a top plan view of a peg of the peg system of FIG. 1A adapted for attachment to the left side of a motorcycle.

As described above, the peg 110 is rotatably connected to the bracket 100. As shown in FIGS. 2 and 3, the peg 110 includes a pivot end 111, a distal end 112, and a foot surface 113. The pivot end 111 may include a peg opening 114 adapted to receive a portion of the axle member 120 for rotatably connection to the bracket 100. Alternatively, the pivot end 111 may include a portion of an axle receivable by the bracket 100. As depicted, the pivot end 111 may be substantially cylindrical and configured to partially nest with in the pivot portion 103 of the bracket 100. The peg 110 is thus rotatable relative to the bracket 100 between the retracted orientation where the distal end 112 is substantially proximate the bracket 100 and the extended orientation of FIG. 2 where the distal end 112 is displaced a horizontal distance from the bracket 100. The extend orientation may be configured to match the proportions of a particular rider and/or motorcycle and may include a vertical displacement component as well as a horizontal component. In various embodiments, in the extended orientation the peg 110 may be rotated about a substantially vertical axis about 75 to about 95 degrees relative to retracted orientation. In a particular embodiment, the peg 110 opens to about 85 degrees. The peg 110 may include a feature such as a groove or raised portion (not shown) that facilitates engagement of the riders foot for manipulation of the peg 110 between extended and retracted orientations and vice-versa.

The length of the peg 110, as defined by the distance between the pivot end 111 and the distal end 112, is configured to support a riders foot on the foot surface 113 when the peg 110 is in the extended orientation. The foot surface 113 may be inclined or sloped relative to the ground such that the toe portion of the rider's foot would rest higher than the heel portion when the foot is placed on the peg 110. In various embodiments, the incline may be from about 0 to about 45 degrees. In a particular embodiment, the incline is about 37 degrees. The distal end 112 may be raised from the foot surface 113 to provide an outer engagement or stop for the rider's foot.

In an alternate embodiment, the peg 110 may be configured with a substantially rectangular planar surface to provide a larger, more comfortable surface for the rider's foot to rest on. In such embodiment, the bracket 100 would be modified accordingly to conform to the shape of the peg 110. Additionally, the peg 110 may be configured to be rotatable about its own axis. In this manner, the rider may adjust the angle of the substantially rectangular planar surface of the peg 110 relative to the ground for comfort.

The bracket 100 and the peg 110 may comprise machined or cast metal. In a particular embodiment, the bracket 100 and the peg 110 comprise machined aluminum. However, in other embodiments the bracket 100 and the peg 110 may comprise other materials, for example, steel. Further, various finishes may be applied to the bracket 100 and the peg to substantially correspond with the finish of components of the motorcycle including, for example, polish, anodization, chrome, paint, galvanization, powder coating, and combinations thereof. The peg 110 may further include a surface treatment along a portion of the foot surface 113. The surface treatment may include texturing or other features to enhance the interface between the riders footwear and the peg 110. In a particular embodiment, the surface treatment comprises a machined diamond pattern.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated. The features of the embodiments described herein may be combined in all possible combinations of methods, apparatus, modules and systems.

What is claimed is:

1. A retractable peg system, comprising:
    a bracket including an inner bracket surface along a length of the bracket and an outer surface extending from the inner bracket surface, the inner bracket surface configured for operative and fixed attachment to a motorcycle, the bracket including a recessed portion in the outer surface and a pivot portion, the pivot portion defining a substantially vertical axis of rotation;
    a peg having a first end and a second end, the peg rotatably coupled at the first end to the pivot portion and rotatable about the axis of rotation;
    a biasing member operatively connected to the bracket and engageable with the peg, wherein the peg is rotatable about the axis of rotation between a retracted orientation, where the peg is proximate the bracket and substantially parallel with the inner bracket surface, and an extended orientation, where the second end is horizontally displaced a distance from the bracket, and wherein the biasing member substantially maintains the orientation of the peg absent an external force applied to the peg.

2. The retractable peg system of claim 1, wherein the peg is at least partially received in the recessed portion when the peg is in the retracted orientation.

3. The retractable peg system of claim 1, wherein the first end includes an axle opening configured to partially receive an axle portion, and wherein the pivot portion includes a pivot opening substantially coaxial with the axle opening and configured to partially receive the axle portion.

4. The retractable peg system of claim 3, wherein the inner bracket surface is configured for operative and fixed attachment to the valve cover of the motorcycle.

5. The retractable peg system of claim 4, wherein the peg is rotatable to the extended orientation about the axis of rotation between about 75 and about 105 degrees in relation to the retracted orientation.

6. The retractable peg system of claim 1, wherein the inner bracket surface includes a plurality of openings configured to receive at least one connecting element to operatively attach the bracket to the motorcycle, and wherein the plurality of openings define a plurality of predefined bracket positions relative to the motorcycle disposed along an axis substantially parallel to a longitudinal axis of the motorcycle.

7. The retractable peg system of claim 6, wherein the bracket is adjustably attachable in relation to its attachment position on the motorcycle.

8. The retractable peg system of claim 1, wherein the peg further includes a foot surface, and wherein the foot surface is inclined such that the toe portion of a rider's foot resting on the peg is elevated above the heel portion of the foot when the rider is sitting on the motorcycle.

9. The retractable peg system of claim 1, further comprising one or more detents disposed on the peg, each of the one or more detents configured to receive a portion of the biasing member.

10. The retractable peg system of claim 9, wherein the one or more detents comprises a first detent configured to receive a portion of the biasing member when the peg is in the retracted orientation and a second detent configured to receive a portion of the biasing member when the peg is in the extended orientation.

11. The retractable peg system of claim 1, wherein the bracket is configured such that visible surfaces of the bracket are finished to substantially visually correspond with one or more surfaces of the motorcycle proximate the attached retractable peg system.

12. A retractable peg system, comprising:
a bracket operatively and fixedly connectable in a horizontal orientation to a valve cover of a motorcycle, the bracket including a recessed portion disposed in a lower portion of the bracket and substantially parallel with a longitudinal axis of the motorcycle and a pivot opening located in the recessed portion and defining a substantially vertical axis of rotation;
a peg having a first end and a second end, the first end characterized by an axle opening substantially coaxial with the axis of rotation;
an axle member substantially coaxial with the axis of rotation and rotatably coupling the peg and the bracket such that the peg is rotatable about the axis of rotation between a retracted orientation, where the peg is proximate the bracket and orientated substantially parallel with the longitudinal axis, and an extended orientation, where the second end is horizontally displaced a distance from the bracket; and
a biasing member engageable with the peg such that the peg is not freely rotatable about the axis of rotation absent application of an external force on the peg.

13. The retractable peg system of claim 12, wherein the peg is at least partially received in the recessed portion and substantially flush with a lower surface of the bracket outside the recessed portion when the peg is in the retracted orientation.

14. The retractable peg system of claim 12, further including an attachment member, and wherein the attachment member is configured to fixedly attach to the valve cover of the motorcycle and the bracket.

15. The retractable peg system of claim 14, wherein the bracket is adjustably attachable to the attachment member such that the location of the peg in the extended orientation is selectively positionable along a substantially horizontal axis substantially parallel to the longitudinal axis.

16. The retractable peg system of claim 12, wherein the extended orientation is disposed between about 75 and about 105 degrees about the axis of rotation in relation to the retracted orientation.

17. The retractable peg system of claim 16, wherein the peg includes a first detent adapted to receive a portion of the biasing member when the peg is in the retracted orientation, and wherein the peg includes a second detent adapted to receive a portion of the biasing member when the peg is the extended orientation.

18. A retractable peg system, comprising:
an attachment member configured for operative attachment to a vehicle;
a bracket including a first portion, a pivot portion, and an inner bracket surface, the inner bracket surface fixedly securable to a location on the attachment member selectable from a plurality of predefined locations disposed along an axis substantially parallel to the longitudinal axis of the vehicle;
a peg having a first end and a second end, the peg rotatably coupled at the first end thereof to the pivot portion; and
a biasing member operatively connected to the bracket and engageable with the peg,
wherein the peg is rotatable between a retracted orientation, where the length of the peg is proximate the bracket and substantially parallel to the longitudinal axis, and an extended orientation, where the second end is displaced a distance from the bracket, and wherein the biasing member substantially maintains the orientation of the peg absent an external force applied to the peg.

19. The retractable peg system of claim 18, wherein the peg is at least partially receivable by the bracket when the peg is in the retracted orientation.

20. The retractable peg system of claim 18, wherein the peg system is operatively connected to a valve cover of the vehicle.

* * * * *